United States Patent
Han et al.

(10) Patent No.: US 11,124,648 B2
(45) Date of Patent: Sep. 21, 2021

(54) HEAT-RESISTANT RESIN COMPOSITION AND MOLDED ARTICLE OBTAINED THEREFROM

(71) Applicant: SKC CO., LTD., Gyeonggi-do (KR)

(72) Inventors: Jae Sung Han, Gyeonggi-do (KR); Jin Kyung Kim, Gyeonggi-do (KR); Dohoon Chang, Seoul (KR)

(73) Assignee: SKC CO., LTD., Gyeonggi-do (KR)

( * ) Notice: Subject to any disclaimer, the term of this patent is extended or adjusted under 35 U.S.C. 154(b) by 126 days.

(21) Appl. No.: 16/189,723

(22) Filed: Nov. 13, 2018

(65) Prior Publication Data
US 2019/0144669 A1 May 16, 2019

(30) Foreign Application Priority Data
Nov. 14, 2017 (KR) .................. 10-2017-0151392

(51) Int. Cl.
| | | |
|---|---|---|
| C08L 77/06 | (2006.01) | |
| C08L 71/12 | (2006.01) | |
| C08G 65/48 | (2006.01) | |
| C08L 53/02 | (2006.01) | |
| C08K 3/04 | (2006.01) | |
| C08K 7/04 | (2006.01) | |

(52) U.S. Cl.
CPC ............ C08L 77/06 (2013.01); C08G 65/485 (2013.01); C08L 53/025 (2013.01); C08L 71/12 (2013.01); C08K 3/041 (2017.05); C08K 3/042 (2017.05); C08K 7/04 (2013.01); C08L 2201/02 (2013.01)

(58) Field of Classification Search
CPC combination set(s) only.
See application file for complete search history.

(56) References Cited

U.S. PATENT DOCUMENTS

| | | |
|---|---|---|
| 2003/0092824 A1 | 5/2003 | Bastiaens et al. |
| 2009/0305016 A1 | 12/2009 | Miyoshi et al. |
| 2013/0203922 A1* | 8/2013 | Horiuchi ............... H01B 3/427 |
| | | 524/412 |
| 2017/0190838 A1 | 7/2017 | Ting |

FOREIGN PATENT DOCUMENTS

| | | | |
|---|---|---|---|
| CN | 108587109 A | * | 9/2018 |
| JP | 6-41321 | | 2/1994 |
| JP | 2009-532574 | | 9/2009 |
| JP | 2011-046781 | | 3/2011 |
| JP | 6115386 | | 4/2017 |
| KR | 1020160121383 | | 10/2016 |

OTHER PUBLICATIONS

CN 108587109 A machine translation (2018).*
Extended Search Report Issued by European Patent office dated Mar. 29, 2019.

* cited by examiner

*Primary Examiner* — Ana L. Woodward
(74) *Attorney, Agent, or Firm* — IP & T Group LLP

(57) ABSTRACT

Embodiments relate to a heat-resistant resin composition having an enhanced heat resistance and a molded article obtained therefrom. The resin composition according to the embodiments has a high heat resistance, so that it is capable of forming an excellent appearance without being deformed even though it is subjected to a process that is carried out at a high temperature of 205° C. or higher, such as an on-line painting. Thus, it can be advantageously used as, for example, an exterior material of various transportation means or a housing of electric and electronic products.

7 Claims, No Drawings

HEAT-RESISTANT RESIN COMPOSITION AND MOLDED ARTICLE OBTAINED THEREFROM

The present application claims priority of Korean patent application number 10-2017-0151392 filed on Nov. 14, 2017, which is incorporated herein by reference in its entirety.

TECHNICAL FIELD

Embodiments relate to a resin composition having improved heat resistance and a molded article obtained therefrom. Specifically, the embodiments relate to a resin composition that can be applied to an exterior material of a transportation means, a housing of electric and electronic parts, and the like, which require heat resistance.

BACKGROUND ART

Plastic materials are inferior to metal or ceramic materials in such properties as heat resistance, flame retardancy, and the like, whereas they are lightweight and excellent in processability. Thus, plastic materials are widely used in household goods, automobiles, and electric, electronic, and industrial fields.

For example, a polyamide (PA) resin is a linear polymeric material in which repeated amide bonds (—CO—NH—) constitute its main chain and is also called a nylon resin. Since a polyamide resin has excellent mechanical properties, particularly chemical resistance, friction resistance, abrasion resistance, and the like, it is widely used as engineering plastics, let alone commodity plastics. In addition, polyphenylene ether (PPE) has a high heat deformation temperature (HDT) and excellent electrical and mechanical properties. Thus, it is widely used as an engineering plastic material.

These plastic resins, particularly a PPE resin, are often used together with other plastic materials, rather than they are used alone. When these resins are used together with other resins, the disadvantages of the respective constituting resins can be compensated to thereby meet the properties required according to the intended use.

For example, when PPE is used together with such a resin as polystyrene (PS), polyamide (PA), or the like, it is possible to have such physical properties as impact resistance and chemical resistance of PS and PA in addition to the physical properties of PPE. In particular, it is known that the combination of PPE/PS or PPE/PA exhibits a balance of such physical properties as heat resistance, impact resistance, chemical resistance, and the like. Thus, it is applied to an exterior material of golf carts, motorcycles, automobiles, and the like, and a housing of electrical and electronic products.

Despite these advantages, however, it is difficult for a mixed resin of PPE/PS or PPE/PA to be used in a process that is carried out at a high temperature of 185° C. or higher, or 195° C. or higher, such as an on-line painting process. Further, even if it is used in such a process, there has been a problem that the process must be carried out at a temperature lower than the above-mentioned temperature (see Korean Laid-open Patent Publication No. 2016-0121383).

Therefore, studies on plastic materials that have a higher heat resistance and are applicable to various uses are continuing.

DESCRIPTION OF THE INVENTION

Problem to be Solved

The embodiments aim to provide a resin composition that maintains the excellent properties inherent to each of polyphenylene ether and polyamide and has a high heat resistance required for an exterior material of such transportation means as automobiles, motorcycles, and the like, or a housing of electric and electronic products, so that it is capable of forming an excellent appearance without being deformed even though it is subjected to a process to be carried out at a high temperature of 205° C. or higher.

Solution to the Problem

The embodiments provide a heat-resistant resin composition, which comprises a polyphenylene ether (PPE) resin and a polyamide (PA) resin, wherein the polyamide (PA) resin comprises a first polyamide (PA) resin alone or a mixed resin of a first polyamide (PA) resin and a second polyamide (PA) resin, and the melting point of the first polyamide (PA) resin is higher than the melting point of the second polyamide (PA) resin by 20° C. to 100° C.

In addition, the embodiments provide a molded article that is injection molded from the heat-resistant resin composition.

Advantageous Effects of the Invention

The heat-resistant resin composition according to the embodiments has a high heat resistance, so that it is capable of forming an excellent appearance without being deformed even though it is subjected to a process that is carried out at a high temperature of 205° C. or higher, such as an on-line painting for automobiles. Thus, it can be advantageously used as, for example, an exterior material for automobiles, particularly in the manufacture of a plastic fender for automobiles.

BEST EMBODIMENT FOR CARRYING OUT THE INVENTION

The embodiments provide a heat-resistant resin composition, which comprises a polyphenylene ether (PPE) resin and a polyamide (PA) resin, wherein the polyamide (PA) resin comprises a first polyamide (PA) resin alone or a mixed resin of a first polyamide (PA) resin and a second polyamide (PA) resin. In such event, the melting point of the first PA resin is different from the melting point of the second PA resin. The melting point of the first PA resin may be higher than the melting point of the second PA resin by 20° C. to 100° C.

The PPE resin may be a polyphenylene ether polymer, a modified polyphenylene ether polymer in which a reactive monomer is reacted with a polyphenylene ether polymer, or a mixture thereof.

The PPE resin may have a specific gravity of 0.5 to 2, for example, 0.8 to 1.5, for example, 0.8 to 1.2, and may have a glass transition temperature of 180° C. to 220° C., for example, 180° C. to 210° C., for example, 190° C. to 210° C. Further, the PPE resin may have a coefficient of linear expansion of $8\times10^{-6}$ to $8\times10^{-4}$, for example, $8\times10^{-5}$ to $8\times10^{-4}$, and may have an absorption rate of 0.01% to 0.1%, for example, 0.01% to 0.08%, for example, 0.02% to 0.08%. The absorption rate is a value measured based on the saturation state at 23° C. The PPE resin may be directly manufactured or purchased for use from a vendor such as Bluestar, but it is not limited thereto.

The PA resin may be a polymer obtained by polymerizing an amino acid, a lactam, a diamine, a dicarboxylic acid, or a combination thereof as a main monomer component. For example, the PA resin may comprise a PA homopolymer or copolymer derived from the main monomer component, either alone or in the form of a mixture thereof.

Specifically, the PA resin may be a first PA resin alone or a mixed resin of the first PA resin and the second PA resin. About 13 kinds of the PA resin are commercially available depending on their carbon numbers, chemical structures, and the like, and their physical properties are different from each other.

The first PA resin and the second PA resin have different carbon numbers and chemical structures. The desired properties of the heat-resistant resin composition can be realized by properly adjusting them.

The first PA resin may be a high melting point resin that has a melting point higher than that of the second PA resin. The melting point of the first PA resin may be about 280° C. to about 320° C., for example, about 290° C. to about 320° C., for example, about 295° C. to about 320° C.

In an embodiment, the heat-resistant resin composition may comprise, as the PA resin, a mixed resin of a first PA resin having a melting point in the range as mentioned above and a second PA resin having a melting point lower than that of the first PA resin by 20° C. to 100° C.

In another embodiment, the heat-resistant resin composition may comprise, as the PA resin, a first PA resin having a melting point in the range as mentioned above alone.

The first PA resin may have a moisture content of 3% to 3.5% in an equilibrium state in the atmosphere. The second PA resin may have a moisture content of 2% to 2.8% in an equilibrium state in the atmosphere. However, the first PA resin has a lower dimensional change ratio with respect to the absorption of additional moisture than that of the second PA resin. As a result, a resin composition, which comprises the same, can realize excellent dimensional stability in the use as an exterior material of a transportation means or a housing of electric/electronic products.

The first PA resin may have a weight average molecular weight of about 190 g/mole to about 200 g/mole. The second PA resin may have a weight average molecular weight of about 210 g/mole to about 230 g/mole.

In an embodiment, the first PA resin may be a copolymer of an adipic acid and a diamine having an alkylene group of 3 to 5 carbon atoms. The second PA resin may be a copolymer of an adipic acid and a diamine having an alkylene group having 6 to 8 carbon atoms; or a polymer obtained by ring-opening polymerization of caprolactam.

In an embodiment, the first PA resin may be a polyamide 46 resin, and the second PA resin may be a polyamide 66 resin or a polyamide 6 resin. In another embodiment, the first PA resin may be a polyamide 46 resin, and the second PA resin may be a polyamide 66 resin.

The resin composition may comprise the PPE resin in an amount of 5% by weight to 80% by weight, 10% by weight to 70% by weight, or 10% by weight to 60% by weight, based on the total weight of the resin composition. In addition, the resin composition may comprise the first PA resin in an amount of 1% by weight to 80% by weight, or 4% by weight to 80% by weight, based on the total weight of the resin composition. Further, the resin composition may comprise the second PA resin in an amount of 0% by weight to 80% by weight, or 0% by weight to 75% by weight, based on the total weight of the resin composition.

In addition, the weight ratio of the PPE resin, the first PA resin and the second PA resin may be 5 to 80:1 to 80:0 to 80. Alternatively, the weight ratio of the PPE resin, the first PA resin and the second PA resin may be 10 to 60:4 to 80:0 to 80.

Specifically, the weight ratio of the PPE resin and the PA resin may be 1:0.1 to 10, 1:0.2 to 10, or 1:0.2 to 8. In such event, when the PA resin is a mixed resin of a first PA resin and a second PA resin, the weight ratio of the first PA resin and the second PA resin may be 1:0.1 to 20, 1:0.5 to 20, or 1:0.5 to 15. Within the above content range, the resin composition according to the embodiments may have a heat distortion temperature of 205° C. or higher under a low load.

More specifically, the weight ratio of the PPE resin and the PA resin may be 1:0.1 to 10, the PA resin may be a mixed resin of a first PA resin and a second PA resin, and the weight ratio of the first PA resin and the second PA resin may be 1:0.1 to 20.

In addition, the weight ratio of the PPE resin and the PA resin may be 1:0.2 to 8, the PA resin may be a mixed resin of a first PA resin and a second PA resin, and the weight ratio of the first PA resin and the second PA resin may be 1:0.5 to 15.

Further, the weight ratio of the PPE resin and the PA resin may be 1:0.2 to 8, the PA resin may be a mixed resin of a first PA resin and a second PA resin, and the weight ratio of the first PA resin and the second PA resin may be 1:0.5 to 15.

The resin composition may further comprise an impact modifier that includes a styrene-ethylene-butadiene-styrene (SEBS) resin, a maleic anhydride-grafted styrene-ethylene-butadiene-styrene (MA-SEBS) resin, or a mixture thereof. The SEBS and MA-SEBS serve to improve such physical properties of a PA resin as dimensional stability, compatibility, heat resistance, chemical resistance, molding processability, impact resistance, and the like.

The impact modifier may be comprised in an amount of 2% by weight to 25% by weight, or 4% by weight to 20% by weight, based on the total weight of the resin composition. Within the above content range, the impact modifier can improve the dimensional stability, chemical resistance, impact resistance, molding processability, and the like without deteriorating the heat resistance.

Further, the resin composition may further comprise such additives as a compatibilizer, an antioxidant, a lubricant, a light stabilizer, a light absorber, a conductive additive, or the like, if necessary.

Specifically, the resin composition may comprise maleic acid, maleic anhydride (MA), fumaric acid, citric acid, citric anhydride, or a mixture thereof as a compatibilizer for enhancing the compatibility. More specifically, the compatibilizer may comprise a polar compound and may include, for example, maleic anhydride, citric acid, or mixtures thereof. They react with the PPE resin to form a block copolymer, thereby modifying the PPE resin not only to impart compatibility thereto, but also to reinforce the impact strength thereof. The compatibilizer may be comprised in an amount of 0.01% by weight to 1% by weight, 0.01% by weight to 0.8% by weight, 0.05% by weight to 1% by weight, 0.05% by weight to 0.8% by weight, or 0.1% by weight to 0.5% by weight, based on the total weight of the resin composition.

In addition, the resin composition may comprise an antioxidant to inhibit oxidation or pyrolysis in a high-temperature process. The antioxidant is not limited as long as it is commonly used in the art. For example, it may be Irganox™ 1010, Irganox™ 1076, 3,5-di(tert-butyl)-4-hydroxytoluene (BHT), Irgafos™ 168, Cyanox™ 2246, Cyanox™ LTDP, Cyanox™ STDP, Cyanox™ MTDP, Ultranox™ 626, Mark™ 260, or the like. The antioxidant may be comprised in an amount of 0.01% by weight to 0.5% by weight, or 0.1% by weight to 0.3% by weight, based on the total weight of the resin composition.

The resin composition may comprise a metal stearate-based lubricant, an amide-based lubricant, a paraffin-based lubricant, an ester-based lubricant, or the like in order to increase the fluidity to thereby facilitate the processing when the resins are thermally molded. For example, the lubricant may be ethylene bis-stearamide (EBS), montan wax, polyethylene wax, polypropylene wax, paraffin wax, low molecular weight ethylene-vinyl acetate copolymer (EVA), stearic acid, oleic acid, cetyl alcohol, oleamide, erucamide, stearamide, butyl stearate, glycerol monostearate, glycerine monooleate, stearyl stearate, calcium stearate, barium stearate, lead stearate, magnesium stearate, or the like. The lubricant may be comprised in an amount of 0.01% by weight to 0.5% by weight, or 0.1% by weight to 0.3% by weight, based on the total weight of the resin composition.

The resin composition may comprise a heat stabilizer to enhance the heat resistance. The heat stabilizer may be a halide-based heat stabilizer. Specifically, the heat stabilizer may be copper (I) chloride, copper (I) bromide, copper (II) bromide, potassium bromide, copper (II) chloride, copper (I) iodide, copper (II) iodide, potassium iodide, or the like. The heat stabilizer may be comprised in an amount of 0.01% by weight to 0.5% by weight, or 0.1% by weight to 0.3% by weight, based on the total weight of the resin composition.

The resin composition may comprise a light stabilizer, a light absorber, or the like in order to suppress thermal decomposition. Specifically, the resin composition may comprise an HALS-based light stabilizer, a benzotriazole-based light absorber, a benzophenone-based light absorber, or the like. The light stabilizer and the light absorbent may be comprised in a trace amount. For example, they may be comprised in an amount of 0.01% by weight to 2% by weight, or 0.05% by weight to 1% by weight, based on the total weight of the resin composition.

The resin composition may further comprise a conductive additive that includes a carbon nanotube, carbon black, a carbon fiber, graphene, a metal powder, or a mixture thereof. The conductive additive is dispersed in the resin composition to serve to impart conductivity thereto. The conductive additive may be comprised in an amount of 0.1% by weight to 20% by weight, or 0.5% by weight to 10% by weight, based on the total weight of the resin composition.

The size of the carbon nanotube is not particularly limited, but the diameter may be 0.5 nm to 100 nm or 1 nm to 10 nm, and the length may be 0.01 μm to 100 μm or 0.5 μm to 10 μm. Within the above diameter and length ranges, the conductivity and processability are even better.

In addition to the above, various additives known to be usable in the resin composition or a molded article thereof may be comprised. Specific types and methods of obtaining them are well known to those skilled in the art.

The resin composition may have a heat distortion temperature of 205° C. or higher, 205° C. to 250° C., or 205° C. to 240° C., under a low load when measured according to the ASTM D648 standard (see Test Example 1). Further, the resin composition may have an absorption rate of 1.5% or less, 0.5% to 1.5%, or 0.7% to 1.5%, at a temperature of 23° C. and a relative humidity of 50% when measured according to the ISO 62 standard (see Test Example 2).

In addition, the embodiments provide a molded article injection molded from the resin composition. Specifically, the molded article may be obtained through a processing such as molding of the resin composition. The molded article may be an exterior material of a transportation means such as golf carts. Specifically, the molded article may be a plastic fender for automobiles. But it is not limited thereto. In addition, the molded article may be a housing of electrical and electronic products. But it is not limited thereto.

As described above, the resin composition according to the embodiments has a high heat resistance, so that it is capable of forming an excellent appearance without being deformed even though it is subjected to a process that is carried out at a high temperature of 205° C. or higher, such as an on-line painting for an exterior material of a transportation means or a housing of electrical and electronic products. Therefore, it can be advantageously used in various fields.

EXAMPLE

Hereinafter, the present invention will be described in detail by referring to Examples. But the following Examples are intended to illustrate the present invention, and the scope of the present invention is not limited thereto only.

PPE resin: PPE, Bluestar

First PA resin: polyamide 46 (melting temperature: 290° C.), Stanyl, DSM

Second PA resin: polyamide 66 (melting temperature: 264° C.), Vydyne, Ascend

Impact modifier: SEBS resin, G1651, Kraton

: MA-SEBS resin, FG1901, Kraton

Compatibilizer: maleic anhydride (MA), Yongsan Chemicals

Lubricant: ethylene bis-stearamide (EBS), L-C 140P, Lion Chemtech

Antioxidant: Irganox 1010, BASF

Heat stabilizer: potassium iodide, Nowchem

Examples 1 to 9 and Comparative Examples 1 and 2: Preparation of Resin Compositions The PPE resin, the first PA resin, and the second PA resin were mixed together with the other components in the amounts shown in Table 1 below to prepare a resin composition. Specifically, the respective components were mixed using a twin-screw extruder of 32 mm under the conditions of 30 kg/hr and 330° C. to prepare a resin composition.

Test Example 1: Heat Deformation Temperature (HDT) Under a Low Load

Each of the resin compositions of Examples 1 to 9 and Comparative Examples 1 and 2 was injection molded using a 170-ton electric injection molding machine at an injection temperature of 300° C. and a mold temperature of 100° C. The specimen having a size of 6.4 mm×128 mm was measured for the thermal deformation temperature under a low load of 4.6 kgf in the edgewise direction according to the ASTM D648 standard.

Test Example 2: Absorption Rate

Each of the resin compositions of Examples 1 to 9 and Comparative Examples 1 and 2 was injection molded in the same manner as in Test Example 1. The specimen having a size of 60 mm×60 mm×2 mm (width, length, and thickness) was measured for the absorption rate at a temperature of 23° C. and a relative humidity of 50% according to the ISO 62 standard.

TABLE 1

| | Component (part by weight) | | | | | | | | Low load HDT (° C.) | Absorption rate (%) |
|---|---|---|---|---|---|---|---|---|---|---|
| | PPE | First PA | Second PA | SEBS | MA-SESB | Heat stabilizer | Compatibilizer | Lubricant | Antioxidant | | |
| Ex. 1 | 10 | 40 | 40 | 4 | 6 | 0.3 | 0.5 | 0.3 | 0.3 | 219 | 1.4 |
| Ex. 2 | 30 | 30 | 30 | 4 | 6 | 0.3 | 0.5 | 0.3 | 0.3 | 211 | 1.2 |
| Ex. 3 | 70 | 10 | 10 | 4 | 6 | 0.3 | 0.5 | 0.3 | 0.3 | 206 | 0.8 |
| Ex. 4 | 30 | 5 | 55 | 4 | 6 | 0.3 | 0.5 | 0.3 | 0.3 | 207 | 1.2 |
| Ex. 5 | 30 | 40 | 20 | 4 | 6 | 0.3 | 0.5 | 0.3 | 0.3 | 213 | 1.2 |
| Ex. 6 | 10 | 80 | 0 | 4 | 6 | 0.3 | 0.5 | 0.3 | 0.3 | 234 | 1.4 |
| Ex. 7 | 30 | 60 | 0 | 4 | 6 | 0.3 | 0.5 | 0.3 | 0.3 | 225 | 1.2 |
| Ex. 8 | 30 | 20 | 40 | 4 | 6 | 0.3 | 0.5 | 0.3 | 0.3 | 216 | 1.2 |
| Ex. 9 | 10 | 5 | 75 | 4 | 6 | 0.3 | 0.5 | 0.3 | 0.3 | 206 | 1.4 |
| C. Ex. 1 | 0 | 45 | 45 | 4 | 6 | 0.3 | 0.5 | 0.3 | 0.3 | 201 | 1.8 |
| C. Ex. 2 | 45 | 0 | 45 | 4 | 6 | 0.3 | 0.5 | 0.3 | 0.3 | 195 | 1 |

As shown in Table 1, all of the resin compositions of Examples 1 to 9 had an HDT of 205° C. or higher under a low load and a low absorption rate of 1.5% or less. However, it was confirmed that the resin compositions of Comparative Examples 1 and 2 had lower HDT values than those of the Examples and that the resin composition of Comparative Example 1 had an absorption rate exceeding 1.5%.

From the results shown in Table 1, it is expected that the resin compositions of the Examples are excellent in heat resistance and does not cause deformation even when subjected to a process to be carried out at a high temperature of 205° C. or higher.

The invention claimed is:

1. A heat-resistant resin composition, which comprises:
a polyphenylene ether (PPE) resin; and
a polyamide (PA) resin,
wherein the PA resin is a mixed resin of a first PA resin and a second PA resin,
wherein a melting point of the first PA resin is higher than a melting point of the second PA resin by 20° C. to 100° C.,
wherein the first PA resin is a PA 46 resin and the second PA resin is a PA 66 resin,
wherein a weight ratio of the PPE resin and the PA resin is 1:0.2 to 8,
wherein a weight ratio of the first PA resin and the second PA resin is 1:0.5 to 15,
wherein the heat-resistant resin composition has an absorption rate of 1.5% or less at a temperature of 23° C. and a relative humidity of 50% when measured according to ISO 62 standard, and
wherein the heat-resistant resin composition has a heat distortion temperature of 205° C. or higher under a low load of 4.6 kgf when measured according to ASTM D648 standard.

2. The heat-resistant resin composition of claim 1, which further comprise an impact modifier that includes a styrene-ethylene-butadiene-styrene (SEBS) resin, a maleic anhydride-grafted styrene-ethylene-butadiene-styrene (MA-SEBS) resin, or a mixture thereof.

3. The heat-resistant resin composition of claim 2, which comprises the impact modifier in an amount of 2% by weight to 25% by weight based on the total weight of the heat-resistant resin composition.

4. The heat-resistant resin composition of claim 1, which further comprise a compatibilizer that includes maleic anhydride, citric acid, or mixtures thereof.

5. The heat-resistant resin composition of claim 1, which further comprises a conductive additive that includes a carbon nanotube, carbon black, a carbon fiber, graphene, a metal powder, or a mixture thereof.

6. A molded article, which is injection molded from the heat-resistant resin composition according to claim 1.

7. The molded article of claim 6, which is a plastic fender for automobiles.

* * * * *